Sept. 30, 1930.    J. R. ORELIND    1,777,127
WIDE SPREAD BEATER
Filed July 21, 1928    2 Sheets-Sheet 1
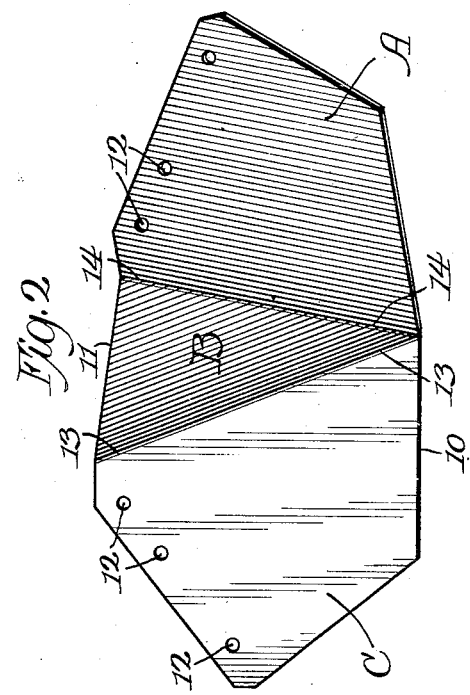
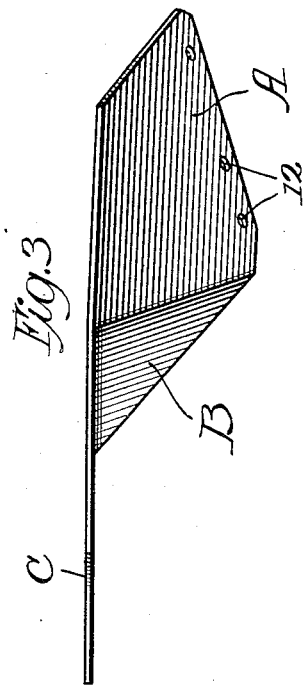
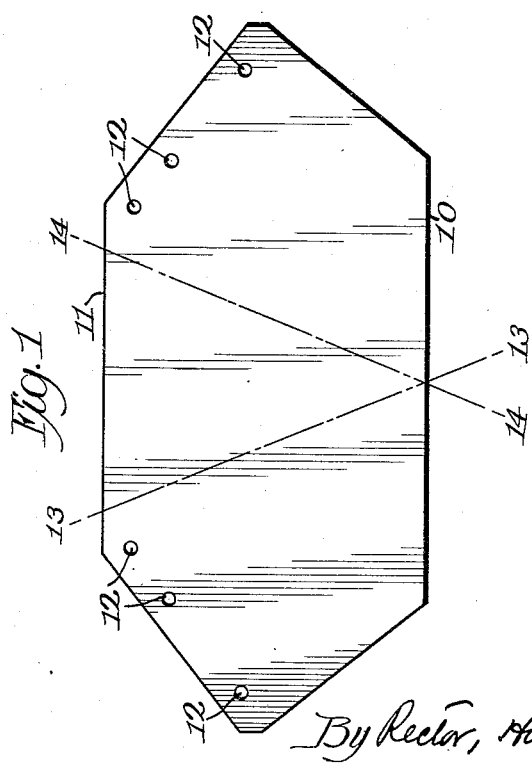
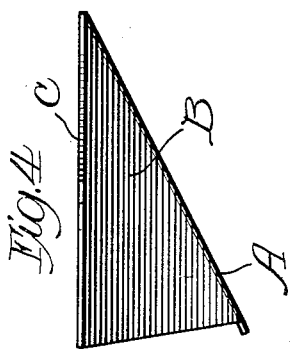
Inventor:
John R. Orelind
By Rector, Hibben, Davis & Macauley Attys.

Sept. 30, 1930.  J. R. ORELIND  1,777,127
WIDE SPREAD BEATER
Filed July 21, 1928   2 Sheets-Sheet 2
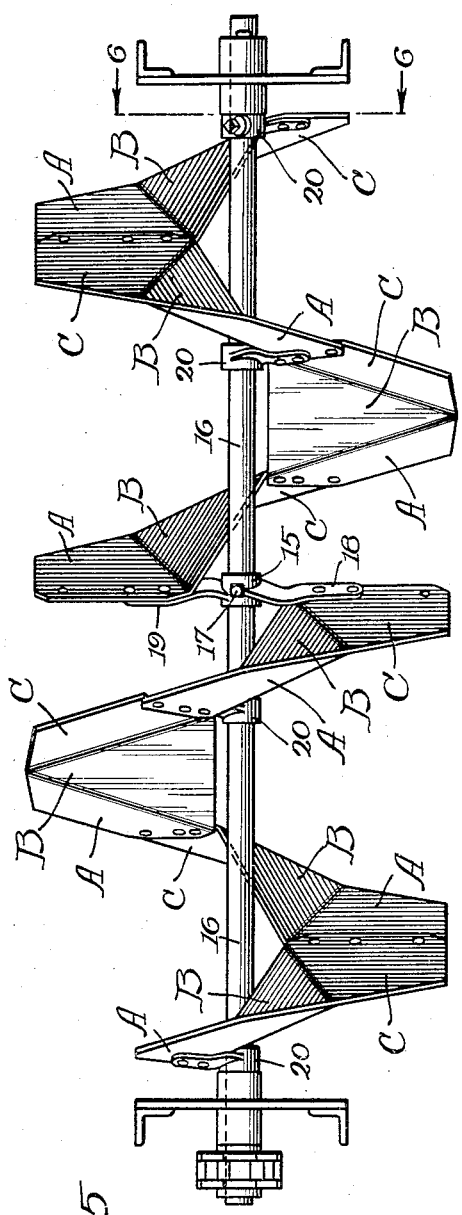
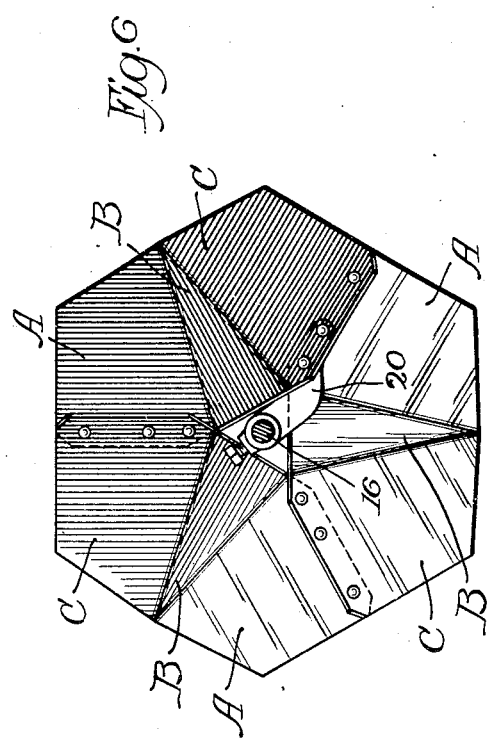
Inventor:
John R. Orelind
By Rector, Hibben, Davis, & Macauley Attys.

Patented Sept. 30, 1930

1,777,127

UNITED STATES PATENT OFFICE

JOHN R. ORELIND, OF MOLINE, ILLINOIS, ASSIGNOR, BY MESNE ASSIGNMENTS, TO MINNEAPOLIS-MOLINE POWER IMPLEMENT COMPANY, OF MINNEAPOLIS, MINNESOTA, A CORPORATION OF DELAWARE

WIDE SPREAD BEATER

Application filed July 21, 1928. Serial No. 294,408.

This invention relates to a wide spread beater.

Fertilizer spreaders are usually provided with a rotating distributor at the rear end of the spreader box, the function of the distributor being to distribute fertilizer in a wider path than the width of the box of the spreader. These distributors are known in the art as "wide spread beaters" owing to the fact that they beat or strike the fertilizer and spread it in a relatively wide path. They are most satisfactory when they not only are capable of distributing the fertilizer evenly but also when they are capable of shredding it so as to prevent it from being thrown out in large chunks. The beaters must be made very strong and durable because they are subjected to very hard usage. At the same time it is important that they be simple and inexpensive because the art has developed to such an extent that reductions in costs are highly important. In considering reductions in costs, it is not only necessary to consider costs of materials but also reductions in manufacturing cost, expense of assembly, ease of repair, and the number and character of the parts that must be kept on hand by dealers for repair purposes. Reduction in costs must not, of course, be made at the sacrifice of efficiency of operation because, it is necessary, in all cases, to have an efficient, durable beater. The big problem is, to make such a simple durable beater at a minimum cost for materials and labor.

In order that a beater may distribute fertilizer in a wide path, the beater elements must be arranged so that they will distribute the fertilizer to the rear and outwardly in opposite directions from the rear of the spreader. This distribution should be uniform, that is, the ground immediately to the rear of the spreader should be covered the same as the ground to the sides so that, as the spreader is drawn across the field, the fertilizer will be evenly distributed in a path which is wider than the spreader itself.

Many different forms of beaters have heretofore been made, practically all of which have elements which differ in size, shape, or location in order to obtain a uniform and wide distribution. In many cases the elements differ both in size and location. Some of them constitute smooth continuous spirals which wind in opposite directions from the center of the beater, the spiral being made up of sinuous-shaped pieces which are costly. These smooth spirals give a reasonable even distribution but they do not beat and shred the fertilizer as efficiently as is desirable. In other cases the beater elements are mounted separately in which event strong individual mountings must be provided. These separated elements do not obtain as uniform a distribution as the smooth spirals but they shred the fertilizer better. All of these beaters are relatively expensive because quite a number of different parts must be manufactured, the expense for tools and labor is considerable, the parts must be assembled in a special way, and quite a number of different kinds of repair parts must be kept in stock by dealers in order that they may be able to replace any one of the different parts that wears out or is broken. These difficulties have been considered inherent in the situation and the expense a necessary evil.

The present invention has for its object the provision of an improved beater made out of a plurality of simple metal stampings which are all alike except that one set is right hand and the other left hand. The factory operations are thus reduced to the making of a single type of metal stamping and the assembly involves merely the connecting together of these stampings in a simple manner and the mounting of them on a shaft. The stampings, because of their peculiar construction, combine to make a simple, durable, efficient, and inexpensive beater.

Another object of the invention is to provide an improved widespread beater in which each half is made out of a plurality of interchangeable stampings.

Other objects and advantages of the invention will appear from the specification and drawings.

An embodiment of the invention is shown in the accompanying drawings in which:

Figure 1 is a plan view of one of the blanks used in making the beater stampings, the view showing the blank after it is stamped out and punched but before it has been bent to shape.

Fig. 2 is a plan view of a blank after it has been bent to shape.

Fig. 3 is a side elevation of the blank shown in Fig. 2.

Fig. 4 is an end view of the blank shown in Fig. 2.

Fig. 5 is a rear elevation of the assembled widespread beater.

Fig. 6 is a sectional end elevation of the line 6—6 of Fig. 5.

As previously mentioned, the beater is built out of a plurality of metal stampings which are alike, except that those for one half of the beater are right handed and those for the other half left handed. These stampings are connected together so as to form a continuous but irregular spiral. Before explaining the beater construction and its advantages, the novel form of stamping and the method of making it will first be explained.

The first operation is to stamp the blanks out of sheet metal of requisite thickness, a thickness of $\frac{1}{8}$ of an inch having been found suitable. These blanks, which are all alike, are hexagonal in shape, as shown in Fig. 1, with two of their opposing sides longer than the other sides, the long side 10 being slightly longer than the long side 11. Holes 12 are punched along the edges of two of the opposite short sides which join the long sides 11, said holes being for fastening devices for fastening one of the stampings to the other when the beater is assembled.

After the blanks are formed and punched they are bent to the shape illustrated in Figs. 2, 3, and 4, which illustrate a right hand stamping. The bending may be done in a press in one operation or, if desired, in two operations. In forming the right hand stamping, the blank is bent downwardly, as viewed in Figs. 1 and 2, along a diagonal line 13—13 which extends from substantially the center of the long side 10 to a point near the left hand end of the long side 11. It is then bent upwardly again along a line 14—14 which extends from substantially the center of the long side 10 to a point near the right hand end of the long side 11. This forms a stamping with three faces A, B and C, all of which are in different planes. In effect, the stamping appears to be a twisted plate but, instead of being twisted into a sinuous shape, the twisting is produced by the stamping process which leaves plain surfaces for striking the fertilizer to distribute it.

In forming the left hand set of stampings, the same blanks are bent along the same lines except that the bend on the line 13—13 is upward and that on line 14—14 downward. In other words, in a right hand stamping the line 13—13 is a ridge and the line 14—14 a valley while in a left hand stamping the line 13—13 is a valley and the line 14—14 a ridge.

It will be quickly appreciated that stampings of this kind may be very easily and inexpensively produced. The blank can be stamped and punched in one operation out of a flat sheet metal strip with very little waste of material and the forming may be done in a press in one operation. Only three dies are required, one to punch out the blanks and the others to bend the right and left stampings to shape whereas, if the elements of the beater were not alike, two additional dies would be required for every different element. Another feature of importance is that, because of the simplicity of these stampings, they can be bent cold whereas the usual elements employed to make beater spirals must be forged hot in order to stretch and shape the material.

The shape of these elements permits them to be assembled together so as to form spirals winding in opposite directions from the center of the beater. The assembly is illustrated in Fig. 5 where the elements are shown connected together. The portions A of each stamping are connected to the portions C of the preceding stamping in the spiral winding to the right, but the left spiral starts with a portion C of one of the left hand stampings and the portions C of succeeding stampings are connected to the portions A of the ones preceding them.

In assembling the beater, one of the stampings, for example, a right hand stamping, is mounted at the center of the beater by being connected to a member 15 mounted on the shaft 16 and fixed thereto by means of a set screw 17. This member has a lower arm 18, and an upper arm 19, the two arms being twisted or inclined relative to the body of the member 15 as illustrated in Fig. 5. The portion A of one of the right hand stampings is connected to the upper arm 19 by means of rivets or other connecting devices and it inclines to the right and passes to the rear of the shaft as viewed in Fig. 5. A second stamping is riveted or otherwise fastened to the first and the second stamping is then fastened to a third and both the latter are connected together and to an arm of a member 20 which is fixed to the shaft 16, the member 20 serving to hold the stampings more firmly in position on the shaft 16. The spiral is continued to the right for the desired length by adding more stampings, a total of four being used for the beater illustrated. The number of arms 20 may be varied depending upon the length of the beater and the desired number of connections, it being possible to use a member 20 at each connection between the stampings. It will be observed that the stampings brace each other by being connected together. This makes it unnecessary to have heavy individual connecting pieces for each element such as would be necessary if each of the elements were separately mounted. The peculiar formation of the stampings enables them to form a spiral when connected together and this spiral comprises a plurality of plane surfaces with sharp corners between the surfaces. The corners tend to shred and tear the fertilizer while the plane surfaces tend to beat and distribute it better than a smooth continuous spiral.

Connected to the lower arm 18 of the member 15 is another of the stampings but, in this case, a portion C of a left hand stamping is connected to the arm and the stamping is inclined to the left and passes in front of the shaft 16. In other words, the left spiral winds in the opposite direction to the right. A second left hand stamping is then connected to the first, the portion C of the second being connected to the portion A of the first and the two being connected together and to an arm 20 fixed to the shaft 16. The spiral is continued to the left by the addition of stampings to make a spiral of the desired length, the end spiral being connected to a member 20 fixed to the shaft 16.

In this manner a beater is built up out of stampings with spirals winding in opposite directions from the center towards the ends of the beater. As the beater rotates the surfaces of the stampings strike the fertilizer and scatter it to the rear and to the sides.

This beater construction has many advantages, some of which have already been mentioned. The metal stampings out of which the spirals are made can be very inexpensively produced and the beater itself can be easily assembled. It is not necessary for a dealer to keep a large quantity of different types of stampings in stock because each of the right and each of the left elements is interchangeable. Whenever any portion of the spirals needs repair, the particular stamping that has been damaged can be replaced by a right or left stamping as the case may be. The construction also permits the building of beaters of different lengths without requiring any change in design of the beater elements. The number of elements used can simply be changed to lengthen or shorten the beater.

It is to be understood that the construction shown is for purposes of illustration only and that variations may be made in it without departing from the spirit and scope of the invention as defined by the appended claims.

I claim:

1. A rotatable wide spread beater having right and left continuous beating-spirals thereon, each spiral having a continuous beating surface comprising a series of hills and valleys all of whose beating surfaces are oblique to the axis of rotation of the beater.

2. A wide spread beater having right and left, continuous beating spirals thereon, each spiral being composed of a series of interchangeable metal stampings connected together to form spirals having continuous beating surfaces.

3. A wide spread beater comprising a rotatable shaft having spirals thereon winding in opposite directions from the center toward the ends of the shaft, each of said spirals being continuous and comprising a series of like metal stampings fastened together and supported by said shaft.

4. A wide spread beater comprising a rotatable shaft, spirals on said shaft winding in opposite directions from the center of the shaft toward its ends, said spirals being built up of a series of like sheet metal elements having angular bends in them, said elements being connected together to form a continuous spiral and being supported by said shaft.

5. A wide spread beater having right and left beating spirals thereon, each spiral comprising a series of metal stampings connected together, each stamping having three plain beating surfaces in different planes.

6. A wide spread beater having right and left, continuous, beating spirals thereon, each spiral comprising a series of metal stampings bent along straight lines to form a spiral composed of a series of flat beating surfaces joined together.

7. An element for forming continuous beater spirals comprising a metal stamping bent along straight lines to form a series of flat beating surfaces joined together, the angles of said surfaces being such that when a series of said elements are joined together they form a spiral.

8. A metal element for forming beater spirals comprising a hexagonal metal member having two long sides one of which is longer than the other, said member being bent in one direction along a line extending from approximately the center of the longer of the two long sides to near one end of the shorter long side and then being bent in the opposite direction along a line extending from approximately the center of the longer of the two long sides to near the other end of the shorter of the two long sides.

9. An element for forming beater spirals comprising a hexagonal sheet metal member having two long sides, holes punched near two of the opposing short sides, said member being bent in one direction along a line extending from near the end of the long side that adjoins one of the short sides adjacent which the holes are punched to approximately the center of the other long side and then being bent in the opposite direction from a point near the other end of the first long side to a point near the center of the second long side.

In testimony whereof, I have subscribed my name.

JOHN R. ORELIND.